Aug. 4, 1925.

G. L. KENNEDY

CAM DEVICE

Filed Feb. 23, 1924

1,548,043

INVENTOR
Guy L. Kennedy
BY
William F. Nickel
ATTORNEY

Patented Aug. 4, 1925.

1,548,043

UNITED STATES PATENT OFFICE.

GUY L. KENNEDY, OF NEW YORK, N. Y., ASSIGNOR TO KEN-CRIP CORPORATION, OF NEW YORK, N. Y.

CAM DEVICE.

Application filed February 23, 1924. Serial No. 694,791.

*To all whom it may concern:*

Be it known that I, GUY L. KENNEDY, a citizen of the United States, residing at New York, in the county of Bronx and State of New York, have invented certain new and useful Improvements in Cam Devices, of which the following is a specification.

My invention relates to improvements in cam devices, particularly cam devices for actuating a plurality of operating members.

An object of this invention is to provide a cam device for producing the strokes of two members moving in different directions; both the edge or periphery of the cam, and the face thereof being active, and the face of the cam preferably being capable of adjustment to vary the effect thereof.

The nature of my invention is set forth in the following description, taken with the accompanying drawings which illustrate the best form of my invention now known to me; and I of course reserve the right to make any changes which do not depart from the principle or essential construction, to the full extent indicated by the general meanings of the terms in which the appended claims are expressed.

On the drawings.

The same numerals identify the same parts throughout.

Figure 1:
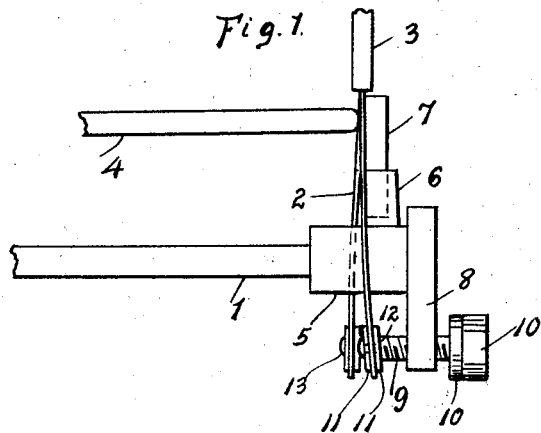
Figure 1 is a side view of a cam device according to my invention.
Figure 2:
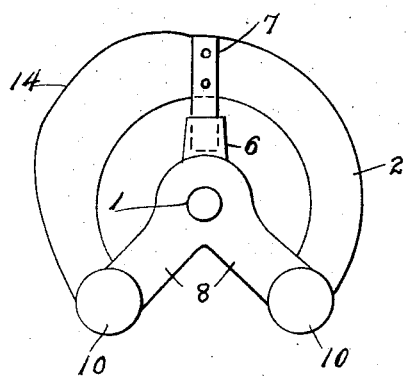
Figure 2 is a front elevation thereof.

At 1 is shown a rotatable shaft mounted in any convenient manner; and 2 is a cam consisting of a flat ring, the edge of which engages and operates a member 3, and the face of which engages and operates another member 4, illustrated as moving at right angles to the first. This cam is mounted on the shaft 1 by means of a hub 5 fixed to the shaft, and carrying a bearing 6 which is bored out to form a socket to receive a pivot pin or journal 7, mounted to turn in the bearing 6. The middle of the ring is secured by riveting or otherwise to the side of the pin 7.

Projecting from the hub 5 at an angle to each other are arms 8, having at their outer ends threaded holes, in each of which is a threaded bolt 9 having a knob 10. The arms 8 and pin 7 are not in the same radial or transverse plane. The two ends of the cam lie adjacent the bolts 9, and the ends of these bolts are turned down and smoothed to pass through openings in the ends of the cam 2. On the extremity of each bolt is a pair of washers 11, one against each surface of the cam; and the washers on each bolt are held, one against a shoulder 12 at the end of each bolt and between this shoulder and one face of the cam, and the other between the opposite face of the cam and an expanded head 13 at the extremity of the bolt. The nose of the cam is indicated at 14.

When the shaft is revolved, the nose 14 actuates the member 3 and the face of the cam the member 4. By turning the screws or bolts 9, the ends of the cam can be moved as desired to change the effect of the operative face of the cam. The pin 7, being pivoted in the bearing 6, turns when the ends of the cam are displaced by the bolts 9. I prefer to make the cam 2 of some flexible metal so that the face of the cam can even be deflected when the ends of the cam are moved for adjustment, and thus afford almost any kind or range of variation required.

In practice the members 3 and 4 can be joined to valves or any other mechanical parts; and I may give the edge of the cam any outline that may be necessary.

Having described my invention, what I believe to be new and desire to secure and protect by Letters Patent of the United States is:—

1. A cam having an operative edge and an operative face to actuate two separate members, the face of the cam being adjustable.

2. A cam device comprising a hub, a bearing, a pivot in said bearing, a cam in the form of a flat ring affixed centrally to said pivot, arms on said hub, and bolts mounted in said arms and rotatably connected to the ends of the cam to adjust same, the edge of the cam having a nose thereon, and both the edge of the cam and the face thereof being operative.

3. A cam in the form of an arc pivoted at the end of a diameter, so that it may be turned and adjusted about said diameter as a pivot, to move its face out of a plane at right angles to its axis of rotation, both the edge and the face of the cam to actuate a member to be operated.

In testimony whereof I affix my signature.

GUY L. KENNEDY.